G. C. JENSEN.
GEAR SHIFT LEVER LOCKING MECHANISM.
APPLICATION FILED JAN. 3, 1917.
1,233,787.  Patented July 17, 1917.
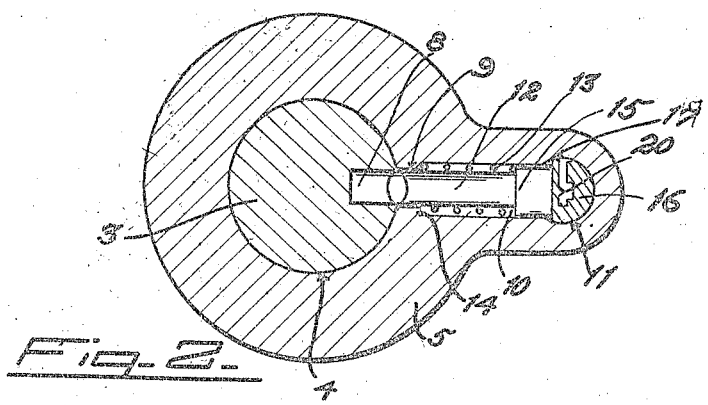
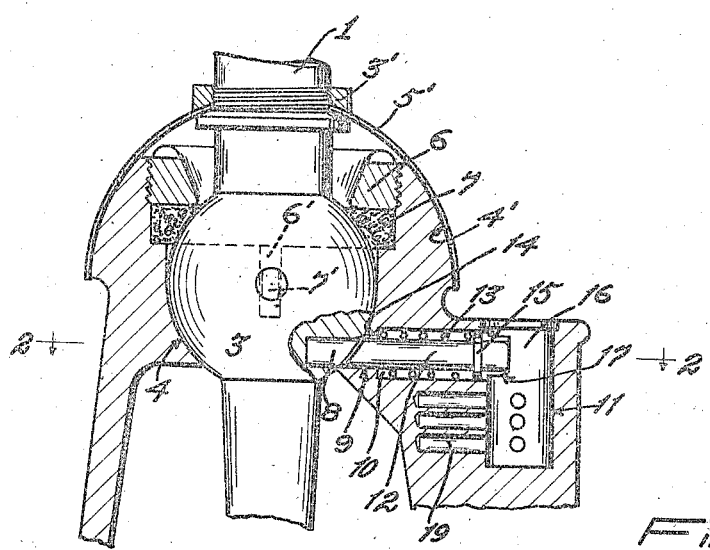
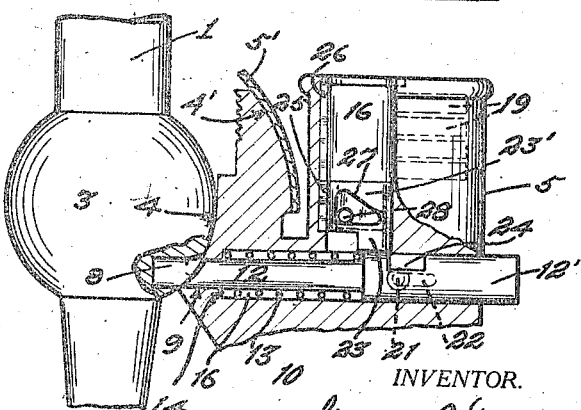
WITNESS
INVENTOR.
George C. Jensen
BY
his ATTORNEYS

UNITED STATES PATENT OFFICE.

GEORGE C. JENSEN, OF OAKLAND, CALIFORNIA.

GEAR-SHIFT-LEVER-LOCKING MECHANISM.

1,233,787. Specification of Letters Patent. Patented July 17, 1917.

Application filed January 3, 1917. Serial No. 140,472.

*To all whom it may concern:*

Be it known that I, GEORGE C. JENSEN, a citizen of the United States, residing at Oakland, in the county of Alameda and State of California, have invented certain new and useful Improvements in Gear-Shift-Lever-Locking Mechanism, of which the following is a specification.

The present invention relates to gear shift lever locking mechanism for motor cars, and more particularly to a type of mechanism adapted for coöperation with the spherical fulcrum member of a universal fulcrumed lever whereby the gear mechanism controlled by the lever may be locked when in neutral position, thereby preventing the use of the car by unauthorized persons; at the same time permitting the car to be moved from place to place by power applied from without.

The invention consists broadly in a lock controlled locking pin carried by the lever housing and capable of operation to engage with the spherical fulcrum portion of the lever when the same is in neutral position to lock the lever from unauthorized operation.

With the above mentioned and other objects in view, the invention consists in the novel construction and combination of parts hereinafter described, illustrated in the accompanying drawings and pointed out in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a vertical sectional view of the preferred embodiment of my invention.

Fig. 2 is a sectional view taken on line 2—2 of Fig. 1.

Fig. 3 is a vertical sectional view of a modified form of structure, wherein the locking bolt or plunger is manually moved to locked position, and is automatically released therefrom on the operation of the locking device therefor.

In the drawings, the reference numeral 1 designates a movable lever, at the upper end of which is a suitable handle, not shown in the drawings, said lever being of the type commonly used for shifting the power transmitting gears of a motor vehicle. Said lever 1 has a spherical fulcrum portion 3 movably seated within a suitable spherical socket 4 formed in a fixed tubular supporting and inclosing member 5. A ring or nut 6 screwed into the upper end of said support 5 retains the lever 1 therein, there being a suitable packing material 7 interposed between said ring and the spherical portion 3 of said lever.

A suitable pin 7' carried by and projecting beyond the surface of the spherical portion 3 coöperates with the vertical groove 6' in the socket 4 and prevents axial rotation of the lever within its socket.

Dust and grit are excluded from the inclosing member 5 by a shell 5' operating on the rounded surface 4' of the support 5 and retained in position on the lever 1 by the nut 3'.

The spherical portion 3 of the lever is formed in its surface with a transversely disposed locking bolt or pin receiving bore 8 which coöperates with a suitable horizontally disposed bore 9 formed in the support 5, at one side of the lever fulcrum. The bore 9 is enlarged at its inner end, as at 10, and communicates with a suitable lock receiving barrel chamber 11 formed vertically within the support 5 and which is open at its upper end. Mounted to reciprocate within the bore 9 and in its enlargement 10 is a suitable locking bolt 12 normally maintained in inoperative position by a suitable spring 13 surrounding the same within the enlargement 10 and disposed between the end wall 14 of the enlargement 10 and a circumferential flange 15 on the bolt.

A suitable key controlled locking barrel 16 is rotatably mounted in the chamber 11 and is provided in its side wall, in line with said bolt 12, with a recess 17 of a sufficient depth to receive the end 18 of the bolt 12 when the same is moved to inoperative position by the spring 13, to permit the universal operation of the lever 1 in shifting the gear mechanism.

Suitable tumblers 19 coöperate with the locking barrel 16 when the same is operated to throw the bolt into its operative or locked position, and lock the same from further rotation until such time as a controlling key, not shown, is inserted into the key slot 20 thereof to release said tumblers.

The locking of the lever 1 from operation when in its neutral position is accomplished by inserting the controlling key, not shown, into the key slot 20 in the barrel 16 to release the tumblers 18, thence rotating the barrel through the key a one-quarter turn in a clock-wise direction, which operation causes the end 18 of the bolt to ride over the surface of the barrel 16 which movement forces the opposite end of said bolt into the bore 8, locking the lever from movement. When it is desired to unlock the lever, rotation of the barrel a one-quarter turn in an anticlockwise direction permits the spring 13 to move the bolt 12 to inoperative position.

In the modified form illustrated in Fig. 3 of the drawings, the enlarged portion 10 of the bore 9 opens at its outer end to the exterior of the support 5 and the end of the locking bolt 12 projects through the same, providing a portion 12' to be manually engaged when it is desired to move the bolt into locked position. A set screw 21 carried by the support 5 operates with the longitudinal groove 22 within the portion 12' of the bolt 12 and limits the movement of the bolt within its bore.

The usual key controlled locking barrel 16 is rotatably mounted within the chamber 11, but in this structure the lower end of the chamber communicates with the enlarged portion 16 of the bore 9 at one side thereof, as in Fig. 1. For retaining the bolt 12 in its locked position I provide a latch 23 adapted to enter a notch 24 in the side wall of said bolt, said latch being carried by a sleeve 23' slidably mounted at the lower end of the barrel 17 and prevented from rotating through a suitable pin 25 carried thereby which operates in a groove 26 extending vertically of the chamber 11. The latch drops by gravity into the notch 24 when the bolt 12 is manually forced inwardly the required distance to lock the lever. A triangular slot 27 is provided in the sleeve 23 and with the same coöperates a pin 28 extending laterally from the barrel 16, the rotation of the barrel causing an axial movement of the sleeve to withdraw the latch 23 from the notch 24. The rotation of the barrel by the controlling key, not shown, causes a coöperative movement of the pin 28 and the slot 27 which withdraws the latch 23 from the notch 24, at which time the bolt is automatically forced by the spring to its neutral or unlocked position.

Having thus described my invention, what I claim as new and desire to protect by Letters Patent is:—

1. In combination with a movable lever having a spherical fulcrum portion formed with a transverse bore therein, a substantially spherical socket member within which said spherical fulcrum is normally seated and removably mounted, said spherical socket member provided with a bore for registering with the bore in said spherical fulcrum, and a lock controlled locking bolt movably mounted in said bore in said socket member and capable of reception when in operative position within said bore in said spherical fulcrum for simultaneously locking said lever from operative movement and from removal from said socket.

2. In combination with a movable lever having a spherical fulcrum portion formed with a transverse bore therein, a substantially spherical socket member within which said spherical fulcrum is normally seated and removably mounted, said spherical socket member provided with a bore for registering with the bore in said spherical fulcrum, a lineally movable locking bolt mounted in said bore in said socket member and capable of coöperation when in operative position with said bore in said spherical fulcrum for simultaneously locking said lever from operative movement and from removal from said socket, and lock controlled means for retaining said bolt in its operative position.

3. In combination with a movable lever having a spherical fulcrum portion formed with a transverse bore therein, a substantially spherical socket member within which said spherical fulcrum is normally seated and removably mounted, said spherical socket member provided with a bore for registering with the bore in said spherical fulcrum, a locking bolt movably mounted in said bore in said socket member and capable of coöperation when in operative position with said bore in said spherical fulcrum for simultaneously locking said lever from operative movement and from removal from said socket, lock controlled means for retaining said bolt in its operative position, and means for automatically moving said bolt to inoperative position on the actuation of said lock controlled means.

4. In combination with a movable lever having a spherical fulcrum portion provided with a transverse bore, a substantially spherical socket member within which said spherical fulcrum is movably seated and removably mounted, said spherical socket portion provided with a bore for registering with the bore in said spherical fulcrum, a locking bolt movably mounted in said bore in said socket member and capable of reception within said bore in said spherical fulcrum for simultaneously locking said lever from operative movement and from removal from said socket, lock controlled means for moving said bolt to operative position and for retaining the same therein, and means for automatically restoring said bolt to inoperative position on a further operation of said lock controlled means.

5. In combination with a movable lever having a spherical fulcrum portion provided with a horizontally disposed transverse bore, a substantially spherical socket member within which said spherical fulcrum is movably positioned and removably mounted, said spherical socket portion provided with a horizontally disposed bore for registering with the bore in said spherical fulcrum, a locking bolt movably mounted in said bore in said socket member and capable of reception when in its operative position within said bore in said spherical fulcrum for simultaneously locking said lever from operative movement and from removal from said socket, a rotatable locking barrel coöperating with said bolt and provided with a recess for registering with one end of said bolt to receive the same when in its inoperative position and for rotation for moving said bolt to operative position, and means for automatically restoring said bolt to inoperative position on the alining of said barrel recess and one end of said locking bolt.

In testimony whereof I have signed my name to this specification in the presence of two subscribing witnesses.

GEORGE C. JENSEN.

Witnesses:
HARRY H. TOTTEN,
D. B. RICHARDS.